(12) United States Patent
Vietri, Jr.

(10) Patent No.: US 7,568,708 B2
(45) Date of Patent: Aug. 4, 2009

(54) PALLET TRUCK STEER WHEEL SAFETY GUARD

(76) Inventor: Gesualdo Vietri, Jr., 131 Springbrook Ct., Summerville, SC (US) 29485

( * ) Notice: Subject to any disclaimer, the term of this patent is extended or adjusted under 35 U.S.C. 154(b) by 267 days.

(21) Appl. No.: 11/708,883

(22) Filed: Feb. 21, 2007

(65) Prior Publication Data

US 2008/0197589 A1 Aug. 21, 2008

(51) Int. Cl.
*B62B 3/06* (2006.01)
(52) U.S. Cl. .................... 280/43.12; 280/160; 187/222
(58) Field of Classification Search ............. 280/43.13, 280/43.12, 160; 254/2 C; 187/222; 180/19.1, 180/19.2, 19.3; D34/28, 38
See application file for complete search history.

(56) References Cited

U.S. PATENT DOCUMENTS

| | | |
|---|---|---|
| 672,975 A | 4/1901 | Cole |
| 779,215 A | 1/1905 | Gale |
| 2,309,138 A | 1/1943 | Quayle |
| 2,424,417 A * | 7/1947 | Quayle ..................... 254/2 C |
| 2,462,007 A | 2/1949 | Schreck |
| 2,488,521 A | 11/1949 | Barrett |
| 2,656,894 A | 10/1953 | Giovannoni |
| 2,940,767 A | 6/1960 | Quayle |
| 2,993,703 A | 7/1961 | Paradise |
| 3,026,089 A | 3/1962 | Meister |
| 3,036,651 A | 5/1962 | Paul et al. |
| 3,119,627 A | 1/1964 | Klumb |
| 3,188,107 A | 6/1965 | Quayle |
| 3,261,617 A | 7/1966 | Becker et al. |
| 3,286,985 A | 11/1966 | Edera |
| 3,462,167 A | 8/1969 | Rateau |
| 3,560,021 A | 2/1971 | Watson |
| 3,567,240 A | 3/1971 | Brassington |
| 3,608,922 A | 9/1971 | Best et al. |
| 3,701,211 A | 10/1972 | Best |
| 3,843,147 A | 10/1974 | Fredricson |
| 3,940,338 A | 2/1976 | Bryntse et al. |
| 3,982,767 A | 9/1976 | Larsson et al. |
| 4,019,597 A | 4/1977 | Carmichael |
| 4,027,771 A * | 6/1977 | Adams ..................... 414/495 |
| 4,109,732 A | 8/1978 | Wright |
| 4,223,901 A | 9/1980 | Klemick |
| 4,300,334 A | 11/1981 | Hines |
| 4,589,669 A | 5/1986 | Kedem |
| 4,671,052 A | 6/1987 | Martin et al. |
| 5,113,960 A * | 5/1992 | Prinz ..................... 180/65.5 |
| 5,253,972 A | 10/1993 | Drew et al. |
| 5,752,584 A * | 5/1998 | Magoto et al. ............. 187/234 |
| D401,716 S | 11/1998 | Marcel |
| D419,741 S | 1/2000 | Johansson |
| 6,260,865 B1 | 7/2001 | Yacobi et al. |

(Continued)

*Primary Examiner*—Christopher P Ellis
*Assistant Examiner*—Brian Swenson
(74) *Attorney, Agent, or Firm*—Turner Padget Graham & Laney, P.A.

(57) ABSTRACT

A pallet truck steer wheel safety guard is provided. In combination with a steering assembly of a pallet truck, a steer wheel safety guard is disposed behind the steer wheel and defines a length parallel to the axis of rotation of the steer wheel. The safety guard defines a height perpendicular to such length, the height extending below the axis of rotation of the steer wheel. The safety guard includes a bumper, and may also include at least one strut extending from the bumper for attachment to the pallet truck.

18 Claims, 7 Drawing Sheets

U.S. PATENT DOCUMENTS 6,394,471 B1   5/2002  Watson
7,267,349 B2 * 9/2007  Sica et al. ............. 280/124.128
2003/0197351 A1 * 10/2003  Burger et al. ............... 280/651
2003/0201615 A1   10/2003  Grooters et al.

* cited by examiner

PALLET TRUCK STEER WHEEL SAFETY GUARD

FIELD OF THE INVENTION

The presently disclosed technology relates to a safety guard for a pallet truck. More particularly, the presently disclosed technology provides a safety guard for the rear steer wheel assembly of a pallet truck.

BACKGROUND OF THE INVENTION

Pallet trucks are used to lift, pull, push, and move loaded pallets. A pallet truck typically includes a frame with two forks extending forwardly of the frame. Extending behind the frame is an operator handle, by which the pallet truck may be maneuvered by a worker. At least one steer wheel is provided behind the frame, and is turnable by movement of the operator handle; two steer wheels are often provided. The steer wheel (s), located behind the frame, is close to the feet of a worker using the pallet truck.

So configured, the pallet truck is pulled and pushed by a worker with the operator handle, the steer wheel(s) allowing for turning of the pallet truck by side-to-side orientation of the operator handle relative to the pallet truck frame.

In operation, the forks of a pallet truck may first be positioned beneath a loaded pallet. By thereafter pivoting the operator handle downwardly, a lifting mechanism of the pallet truck causes the frame and forks to raise, thereby lifting the loaded pallet from the surface upon which it had rested. Various lifting mechanisms have been provided in the art, which cause the forks and frame to lift the weight of the loaded pallet so that the pallet may thereafter be transported upon the pallet truck. Part of the weight of the loaded pallet truck is borne by the steer wheel(s) at the rear of the pallet truck. So loaded, the pallet truck may be pulled and pushed to a second location, and the load thereafter lowered and removed from the forks 24, 25.

Various embodiments of pallet trucks are known, as disclosed in part in the following references, the entire disclosure of each of which is incorporated by reference herein in its entirety for all purposes:

U.S. Pat. No. 2,309,138
U.S. Pat. No. 2,488,521
U.S. Pat. No. 2,940,767
U.S. Pat. No. 2,462,007
U.S. Pat. No. 2,993,703
U.S. Pat. No. 3,026,089
U.S. Pat. No. 3,119,627
U.S. Pat. No. 3,188,107
U.S. Pat. No. 3,261,617
U.S. Pat. No. 3,286,985
U.S. Pat. No. 3,462,167
U.S. Pat. No. 3,567,240
U.S. Pat. No. 3,608,922
U.S. Pat. No. 3,701,211
U.S. Pat. No. 3,843,147
U.S. Pat. No. 3,940,338
U.S. Pat. No. 3,982,767
U.S. Pat. No. 4,223,901
U.S. Pat. No. 4,589,669
U.S. Pat. No. 5,253,972
U.S. Pat. No. D401,716
U.S. Pat. No. D419,741

In all such embodiments, at least one steer wheel is included at the rear of the pallet truck, near the location at which the operator of such a pallet truck is positioned during use of the pallet truck.

Use of a pallet truck with a rear steel wheel (or wheels) subjects the operator to the risk of running over his/her foot with the rear steer wheel as the operator pulls the pallet truck toward himself or herself, a maneuver required in the use of such a pallet truck. Particularly with loaded pallet trucks, that risk may cause great physical injury to the foot. An operator's foot may slip to the wheel(s) while trying to pull the pallet truck toward the operator, or an operator may allow his/her foot to remain too long in the path of a steer wheel of a pallet truck rolling backwards. Furthermore, the feet of nearby co-workers are also at risk of injury from the rolling of such rear steer wheels.

In view of the wide use of pallet trucks and the risks of injury to operators thereof of running over one's own foot or the foot of a co-worker with a rear steer wheel, it would be desirable to provide a pallet truck steer wheel safety guard.

SUMMARY OF THE INVENTION

A pallet truck steer wheel safety guard is disclosed. In accordance with certain aspects of certain embodiments of the present subject matter, a combination is provided of a pallet truck that includes a steering assembly and a steer wheel safety guard. The steering assembly includes at least one rear steer wheel, the rear steer wheel defining an axis of rotation residing in a horizontal plane. The axis of rotation may be turnable in the horizontal plane relative to the orientation of the pallet truck. The steer wheel safety guard is carried by the steering assembly and is turnable with the steering assembly relative to the orientation of the pallet truck. The safety guard is disposed behind the rear steer wheel, and defines a length parallel to the axis of rotation of the steer wheel. Further, the safety guard defines a height perpendicular to the length, the height extending below the plane of the axis of rotation of the steer wheel.

In accordance with additional aspects of other embodiments of the present subject matter, the steer wheel safety guard may further include a strut, the strut attached to the safety guard and extending to and attached to the steering assembly. In accordance with yet additional aspects of other embodiments of the present subject matter, the steering assembly may include a steering column, the strut being attached to the steering column.

In accordance with still further aspects of other embodiments of the present subject matter, an axle may be provided, wherein the rear steer wheel rotates upon the axle, and an axle strut may be provided extending from the safety guard to the axle and carried by the axle.

In accordance with other aspects of other embodiments of the present subject matter, a combination is provided that includes a pallet truck with a steering assembly turnable relative to the pallet truck. The steering assembly includes a rear steer wheel defining a width and rotating upon an axle. The axle may reside in a horizontal plane. The combination may further provide a steer wheel safety guard that includes a bumper disposed behind the rear steer wheel and a strut attached to the bumper and carried by the steering assembly. The safety guard may define a length parallel to the axle, the length approximating the width of the rear steer wheel. The safety guard may further define a height perpendicular to the length, the height extending below the plane in which the axle resides.

In accordance with additional aspects of other embodiments of the present subject matter, the rear steer wheel may be adapted to roll upon a surface below the axle, with the safety guard extending downwardly proximate to that surface.

In accordance with still further aspects of the present subject matter, the bumper may include flanges extending forward and adjacent to the rear steer wheel(s). Still further, an axle strut may be provided, extending from the bumper to the axle. The axle strut may define an aperture therethrough, with the axle disposed through the aperture. The axle strut may be disposed upon the axle inboard of the rear steer wheel(s), or outboard of the rear steer wheel(s). Further, the aperture may include a mounting slot adapted for passage of the axle therethrough.

In accordance with aspects of other embodiments of the present subject matter, a combination is provided of a pallet truck and a steer wheel safety guard. The pallet truck has a steering assembly including steer wheels and a steering column. The steer wheels reside on an axis of rotation. The steer wheels together define a side-to-side width along the axis of rotation, and further define a radius of rotation. The steering column may be in communication with the steer wheels to turn the axis of rotation relative to the pallet truck. The safety guard may include a bumper, the bumper being disposed behind the steer wheels. The bumper may define a length parallel to the axis rotation upon which the steer wheels reside, that length at least as great as the side-to-side width of the steer wheels. The bumper may further define a height perpendicular to the length, the height extending at least half of the radius of the steer wheels below the axle. The safety guard may further include a steering column strut, the strut having opposed ends. One end of such steering columns strut may be attached to the bumper and the other end may be attached to the steering column.

In accordance with additional aspects of other embodiments of the present subject matter, the steer wheels may be adapted to roll upon a surface below the axle and the safety guard may extend proximate to that surface. In accordance with yet additional aspects of other embodiments of the present subject matter, the bumper may further include flanges extending forward adjacent to the rear steer wheels.

In accordance with still further aspects of other embodiments of the present subject matter, an axle may be provided along the axis rotation of the steer wheels, and a axle strut may be provided extending from the bumper to the axle. The axle strut may define an aperture therethrough with the axle disposed through the aperture. The axle strut may be disposed upon the axle inboard of the rear steering wheels, or outboard of the rear steering wheels. In other embodiments, the aperture in the axle strut may include a mounting slot adapted for passage therethrough of the axle.

Additional aspects and features of the present subject matter are set forth in the appended drawings and in the detailed description below, or will be apparent to those of ordinary skill in this technology. It should be further appreciated that modifications and variations to specific features and elements may be practiced in various embodiments, and uses of the inventions, without departing from the spirit and scope of the subject matter. Variations might include, but are not limited to, substitution of equivalent means, features, or aspects for those that are illustrated, referenced, or discussed herein, as well as the functional, operational, or positional reverse of various parts, features, aspects, or the like. It is to be understood that different embodiments, as well as presently preferred embodiments of the present subject matter, may include various combinations or configurations of the presently disclosed features, elements, or aspects, or their equivalents. Such embodiments may include combinations of features, parts, or aspects, or configurations thereof that are not expressly shown in the figures or stated in the detailed description. Additional embodiments of the present subject matter, not necessarily expressed in the summarized section, may include or incorporate various combinations of aspects of features, components, or aspects referenced in the summarized subjects above, and/or other features, components, or aspects as otherwise discussed in this disclosure. Those of ordinary skill in the art will better appreciate the features and aspects of such embodiments and others upon review of the remainder of this specification.

BRIEF DESCRIPTION OF THE DRAWINGS

A full and enabling disclosure of the present invention, including the best mode thereof, directed toward one of ordinary skill in the art, is set forth in the specification, which makes reference to the appended figures. It should be noted that the appended drawings are not necessarily to scale in all instances.

DETAILED DESCRIPTION

Figure 1:
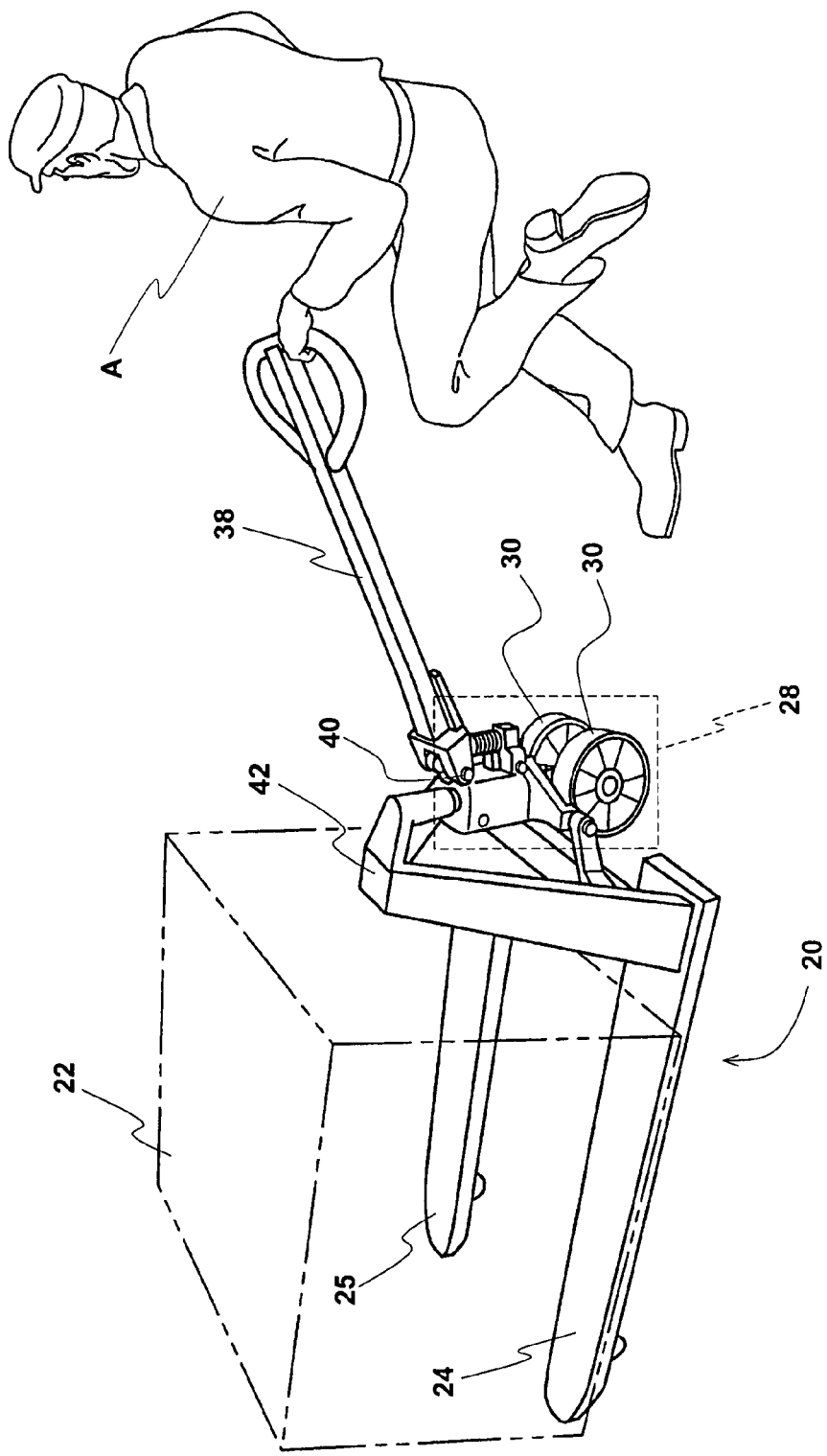
FIG. 1 is a perspective view of an exemplary pallet truck.

Reference will now be made in detail to presently preferred embodiments of the present subject matter, one or more examples of which are illustrated in the drawings. Each example is provided by way of explanation of the invention, and is not meant as a limitation of the invention. Features illustrated or described as part of one embodiment may be used on another embodiment to yield a further embodiment. It is intended that the present application includes such modifications and variations as come within the scope and spirit of the invention. Selected combinations or aspects of the disclosed subject matter correspond to a plurality of different embodiments of the present invention. Certain features may be interchanged with certain devices or features not expressly mentioned, which perform the same or similar function.

The present subject matter may be more fully appreciated with reference to an exemplary pallet truck, an embodiment of which is depicted in FIG. 1. The pallet truck, generally 20, is used to move a load 22 (depicted in phantom). The pallet truck 20 includes a frame 42 and forks 24, 25 extending forwardly from such frame. Forks 24, 25 may be rolled beneath load 22, then the operator handle 38 pivoted up and down about handle pivot pin 40, causing frame 42 and forks 24, 25 to raise, thereby also raising load 22.

As shown in FIG. 1, a pallet truck includes at least one steer wheel 30 at the rear of the pallet truck. By moving operator handle 38 side to side, steer wheel 30 is caused to turn, thereby allowing for steering of pallet truck 20. Operation of pallet truck 20 requires that an operator, generally A, lift, steer, push, and pull upon operator handle 38. To do so, operator A is positioned near a steer wheel 30.

Figure 2:
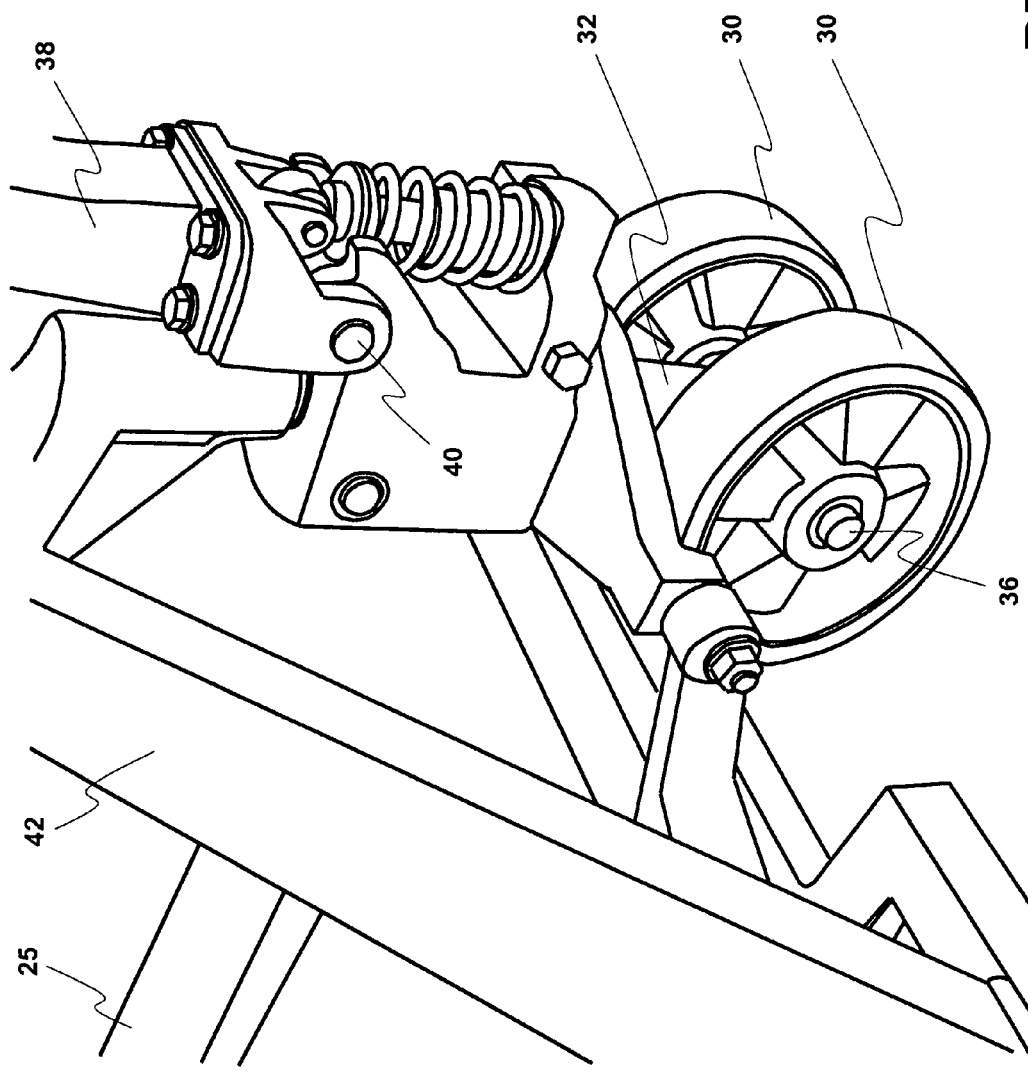
FIG. 2 is a first perspective view of a steering assembly of an exemplary pallet truck.

Pallet truck 20 includes steering assembly 28. An exemplary embodiment of a steering assembly 28 is depicted in greater detail in FIG. 2 and FIG. 3. Operator handle 38 is attached to pallet truck 20 about handle pivot pin 40. Pivoting operator handle 38 up and down about handle pivot pin 40 actuates the lifting mechanism of pallet truck 20, raising and lowering frame 42 and forks 24, 25. Swinging operator handle 38 side to side causes steering column 32 to turn steer wheels 30. As can be seen particularly in FIG. 3, steering column 32 depends downwardly from frame 42. Steer wheels 30 are mounted upon wheel axle 31, which is disposed through steering column 32. Wheel axle 31 is secured in steering column 32 with axle bolt 34.

Figure 3:
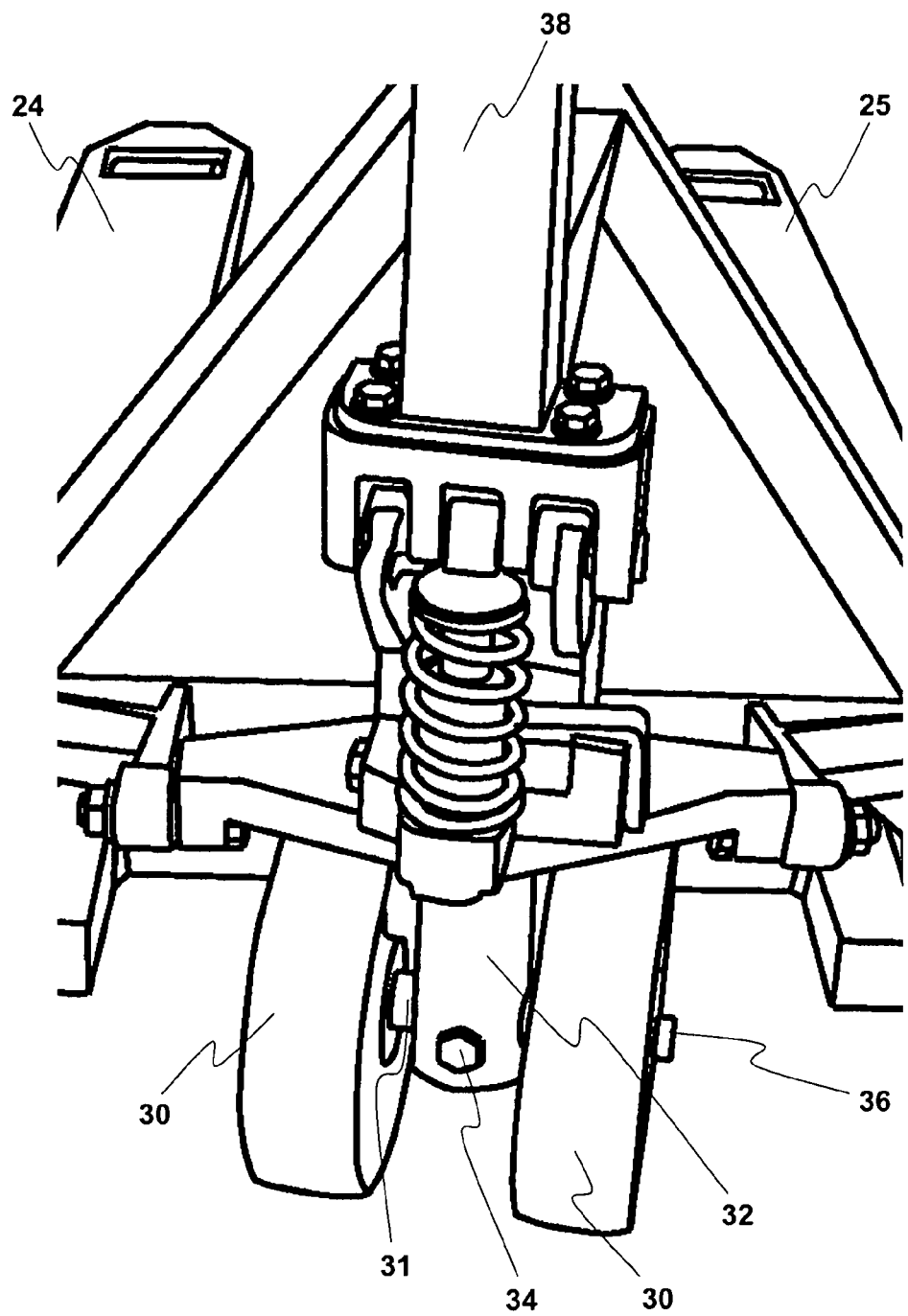
FIG. 3 is a second perspective view of a steering assembly of an exemplary pallet truck.
Figure 4:
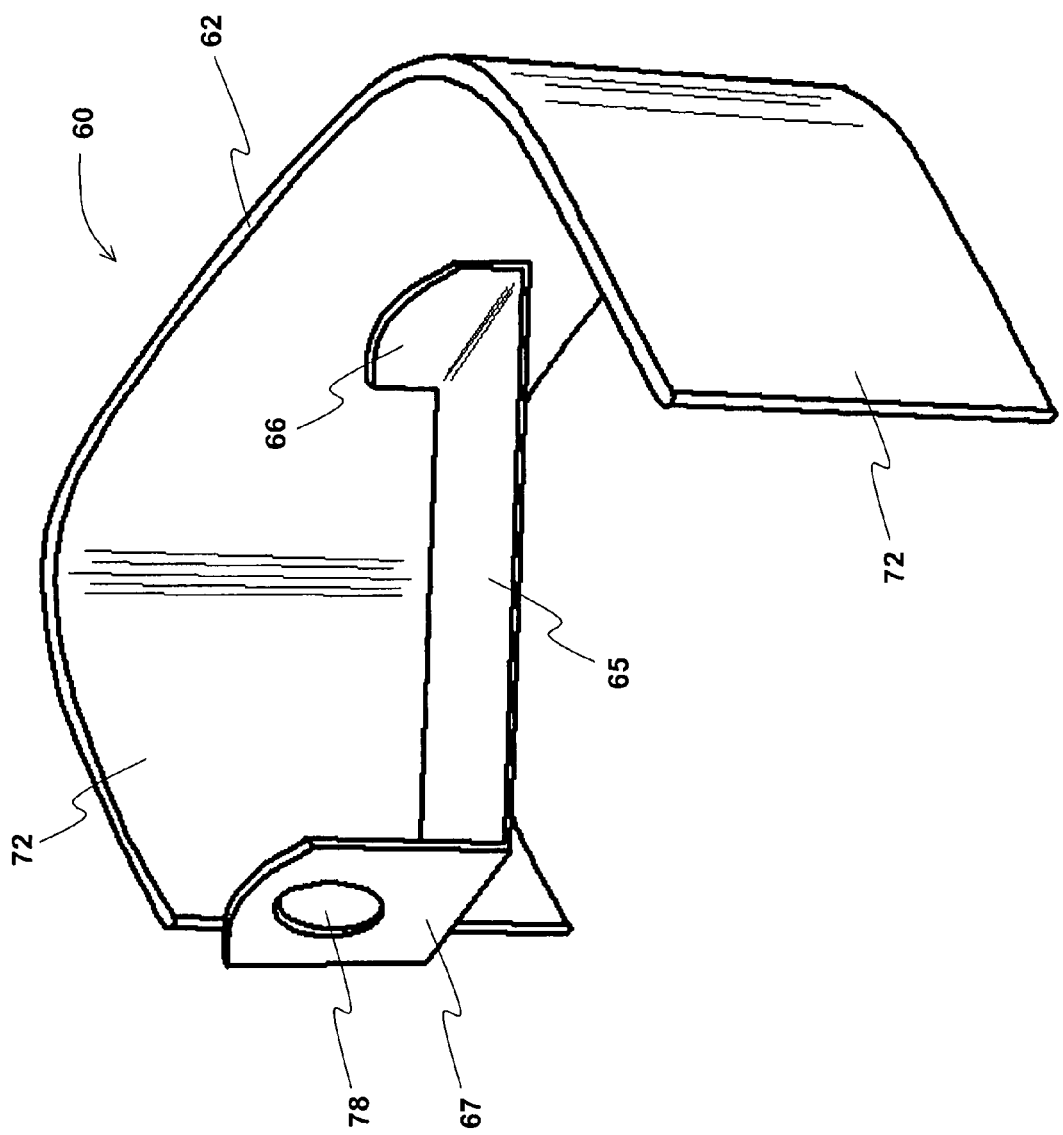
FIG. 4 is a perspective view of a pallet truck steer wheel safety guard in accordance with certain aspects of the present invention.

FIG. 4 depicts an embodiment of a pallet truck steer wheel safety guard in accordance with the present invention. The safety guard, generally 60, includes a bumper 62 and a steering column strut 65. Bumper 62 may be a rigid member, configured for placement behind the steer wheel of a pallet truck. More particularly, bumper 62 may be disposed proximate to the plane upon which the wheel of the pallet truck is to be operated, to thereby prevent accidental contact of the pallet truck steer wheels with the operator's foot. Safety guard 60 may also include flanges 72, flanges 72 disposed to extend forward of bumper 62 and adjacent the rear steer wheel or steer wheels of the pallet truck. Steering column strut 65 is an elongated, rigid member. Steering column strut 65 includes strut end 66 which is attached to bumper 62. Opposite strut end 66 may be included a tab 67. Tab 67 may be used to mount safety guard 60 upon the steering assembly of a pallet truck. For example, tab 67 may be affixed to a steering column, such as steering column 32 in FIG. 2 and FIG. 3. Such attachment may be made by bolting tab 67 to a steering column 32 through steering column strut hole 68. Alternatively, tab 67 may be affixed to a steering column 32 by spot welding. Still alternatively, tab 67 may be affixed to a steering column 32 with use of a circumferential clamp, such as a hose clamp. Alternative methods of attachment of tab 67, so as to result in a fixed structural assembly, may also be employed. Furthermore, tab 67 may alternatively be fixed upon other structures of a pallet truck steering assembly that turn with the steer wheel in other embodiments of pallet trucks. The embodiment of the safety guard depicted in FIG. 4 includes lateral flanges 72, but such flanges need not be provided in all instances.

Figure 6:
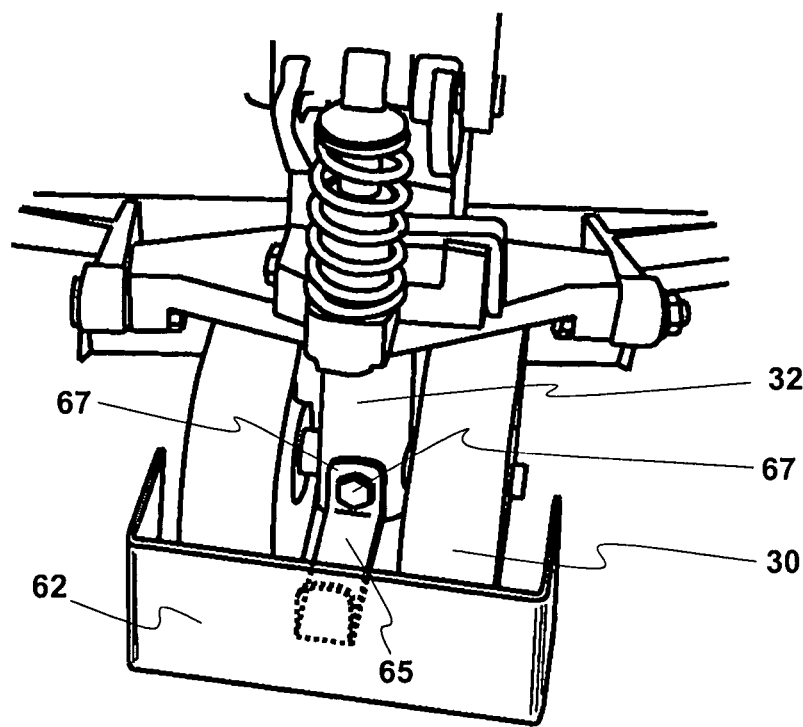
FIG. 6 is a perspective view of a pallet truck steer wheel safety guard in accordance with certain aspects of the present invention, attached to a steering assembly of a pallet truck.

FIG. 6 illustrates an embodiment of a pallet truck steer wheel safety guard, of a configuration similar to that shown in FIG. 4, attached to a steering assembly of a pallet truck. As illustrated in FIG. 6, safety guard 60 has been attached to steering column 32 with axle bolt 34, axle bolt 34 having been disposed through tab 67 and through steering column 32.

Figure 5:
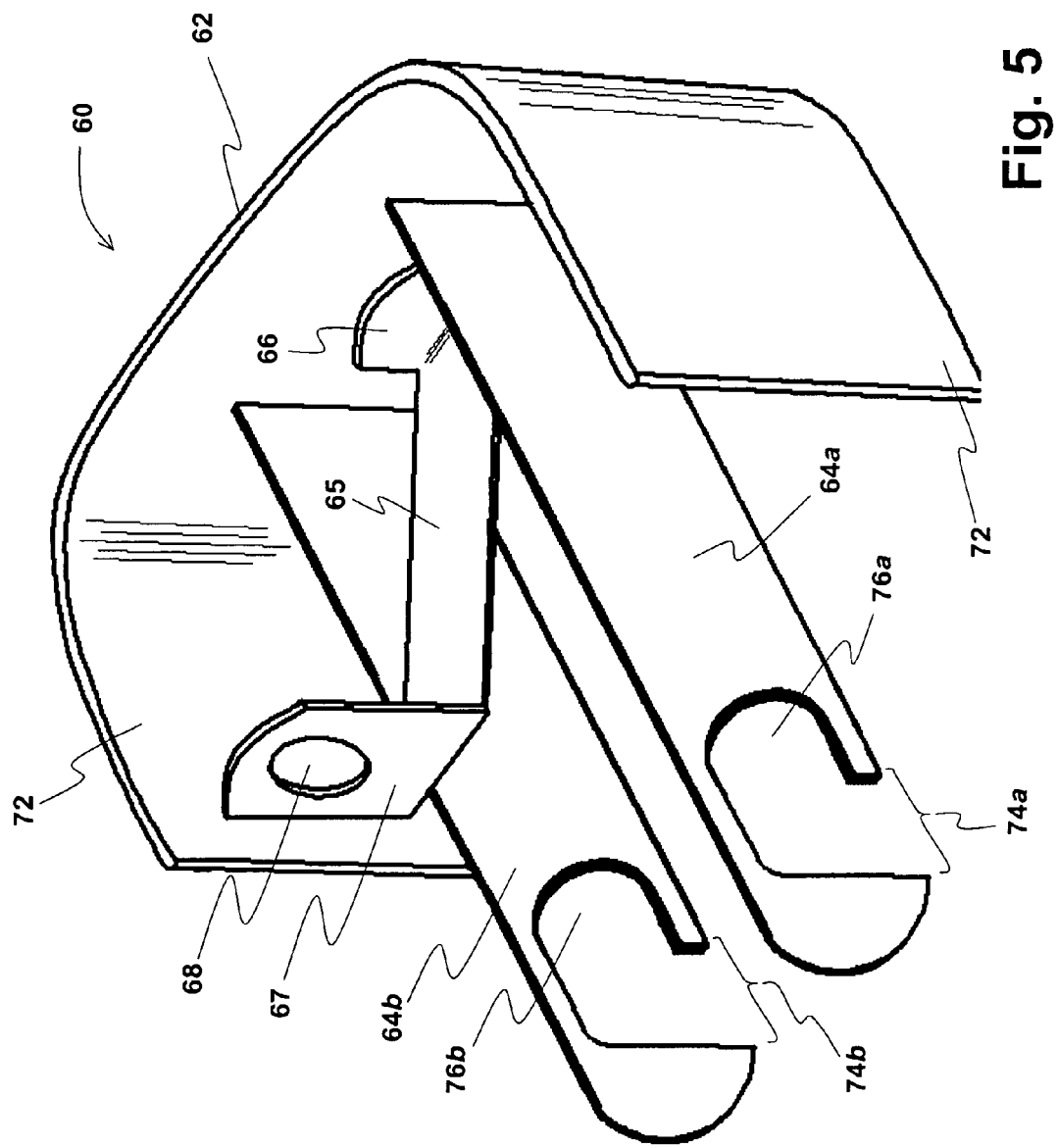
FIG. 5 is a perspective view of a pallet truck steer wheel safety guard in accordance with certain aspects of the present invention.
Figure 7:
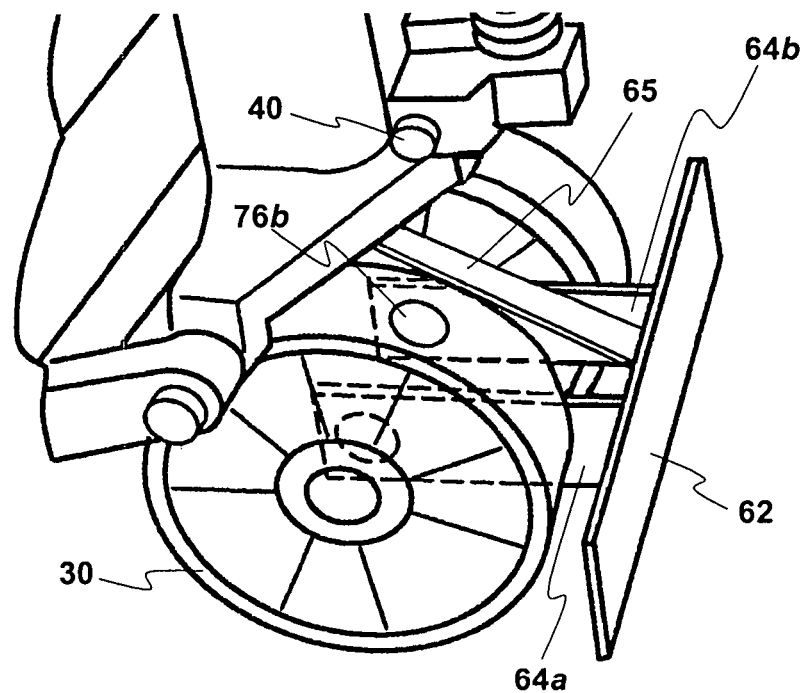
FIG. 7 is a perspective view of a pallet truck steer wheel safety guard in accordance with certain aspects of the present invention.
Figure 8:
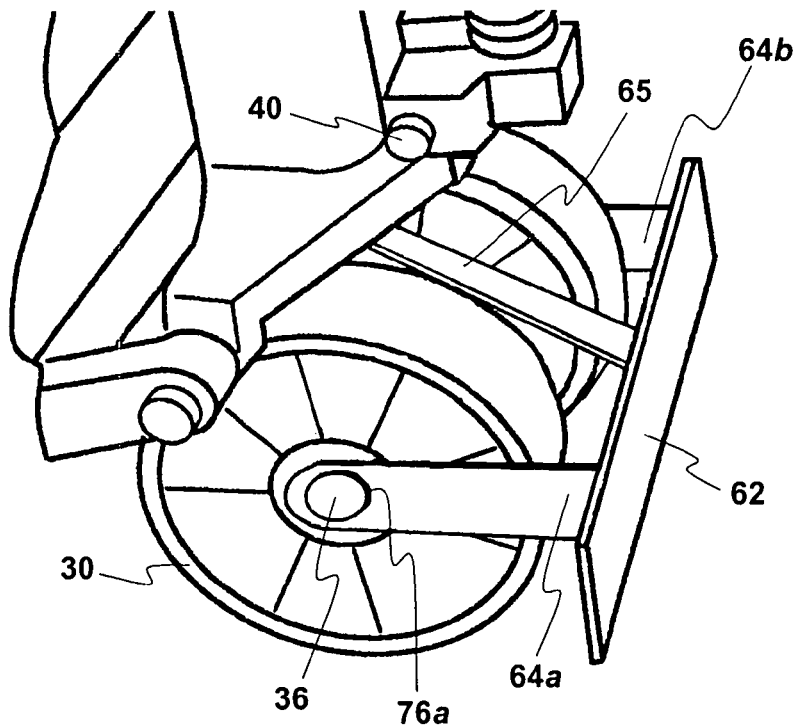
FIG. 8 is a perspective view of a pallet truck steer wheel safety guard in accordance with certain aspects of the present invention.

FIG. 5 illustrates another embodiment of a safety guard 60. The embodiment of the safety guard 60 shown in FIG. 5 includes a bumper 62, a steering column strut 65, a tab 67, and flanges 72. The embodiment illustrated in FIG. 5, however, also includes two axle struts 64a,b. While two axle struts 64a,b are illustrated in FIG. 5, other embodiments may include only a single such axle strut 64a or 64b. Axle struts 64a,b are elongated, rigid members, extending from bumper 62 for placement about a wheel axle 31 (such as shown in FIG. 3) of a pallet truck. Axle struts 64a,b may include an axle hole 76a,b, as illustrated for example in FIG. 7. Axle hole 76a,b may be defined within an axle strut 64a,b opposite the attachment of axle strut 64a,b to a bumper 62. Axle hole 76a,b may be configured for the passage of a wheel axle 31 (see FIG. 3) therethrough. As illustrated in FIG. 7, an axle strut 64a,b may be configured upon a safety guard 60 such that the axle strut 64 is carried by wheel axle 31 inboard of a wheel 30, between a wheel 30 and steering column 32; such a configuration is depicted in FIG. 7. Alternatively, the axle strut 64a,b may be configured upon the safety guard 60 such that, when mounted to a pallet truck, the axle struts 64a,b are disposed outboard of the steer wheel 30, as illustrated in FIG. 8, opposite wheel 30 from steering column 32. With reference to FIG. 8 for illustration, in one embodiment safety guard 60 may include two axle struts 64a,b that are biased toward each other and that define axle holes 76a,b opposite bumper 62. So configured, such a safety guard 60 may provide for snap-fit engagement of axle struts 64a,b over axle ends 36 of the steering assembly of a pallet truck.

Returning to FIG. 5, safety guard 60 with at least one axle strut 64a or b may also include an axle slot 74a,b leading to the aperture 76a,b. Aperture slot 74a,b may be configured to allow passage into axle hole 76a,b of a wheel axle 31, such that safety guard 60 may be installed upon a pallet truck without removal of a steer wheel 30 from the pallet truck steering assembly. For example, axle struts 64a,b may be inserted inboard of steer wheels 30, on either side of steering column 32, and interfitted on to wheel axle 31 by passing wheel axle 31 through axle slots 74a,b, disposing wheel axle 31 in axle holes 76a,b; steering column strut 65 may then be affixed to steering column 32, resulting in an assembled, installed, and functional pallet truck steer wheel safety guard.

Figure 9:
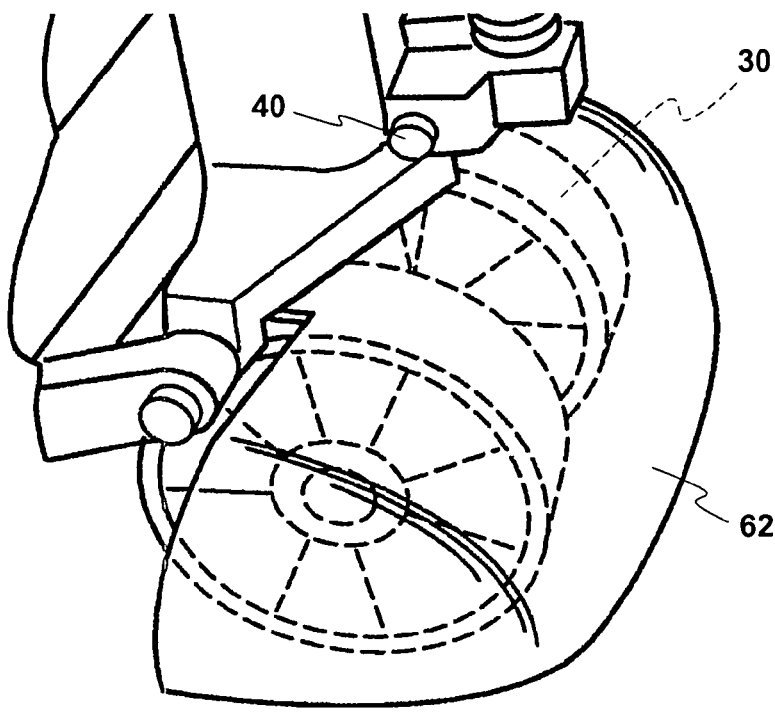
FIG. 9 is a perspective view of a pallet truck steer wheel safety guard in accordance with certain aspects of the present invention.

A further embodiment of a pallet truck steer wheel safety guard in accordance with the present invention is illustrated in FIG. 9. As shown in FIG. 9, bumper 62 may be configured as a curvilinear shell. Although not illustrated in FIG. 9, such an embodiment of safety guard 60 may be attached to the steering assembly of a pallet truck as described above with reference to other embodiments of safety guard 60.

As disclosed herein, the present invention provides a safety guard for a pallet truck steer wheel that protects the feet of operators of such a pallet truck from injury by such a steer wheel. While preferred embodiments of the invention have been shown and described, modifications and variations may be made thereto by those skilled in the art without departing from the spirit and scope of the present invention. Thus, it should be understood that aspects of various embodiments may be interchanged, both in whole or in part. Furthermore, those of ordinary skill in the art will appreciate that the foregoing description is by way of example only, and is not intended to be a limitation of the invention as further described in the appended claims.

The invention claimed is:

1. A combination comprising:
  a pallet truck including a steering assembly, said steering assembly including:
    a rear steer wheel, said rear steer wheel defining an axis of rotation, said axis of rotation residing in a horizontal plane and turnable in said plane relative to said pallet truck;
  a steer wheel safety guard, said steer wheel safety guard:
    carried by said steering assembly and turnable with said steering assembly;

disposed behind said rear steer wheel;
defining a length parallel to said axis of rotation; and
defining a height perpendicular to said length, said height extending below said plane of said axis of rotation behind said rear steer wheel,
wherein said steer wheel safety guard further includes a strut, said strut attached to said steer wheel safety guard and extending to said steering assembly, said strut attached to said steering assembly.

2. The combination of claim 1, wherein said steering assembly includes a steering column, said strut attached to said steering column.

3. The combination of claim 1, further including an axle, wherein said rear steer wheel rotates upon said axle, and further including an axle strut, said axle strut extending from said steer wheel safety guard to said axle, said axle strut carried by said axle.

4. A combination, comprising:
a pallet truck, said pallet truck including a steering assembly turnable relative to said pallet truck, said steering assembly including:
a rear steer wheel, said rear steer wheel defining a width;
an axle, said rear steer wheel rotatable upon said axle, said axle residing in a horizontal plane;
a steer wheel safety guard, said steer wheel safety guard including:
a bumper, said bumper disposed behind said rear steer wheel;
a strut, said strut defining opposed first and second ends, said first end attached to said bumper, said second end carried by said steering assembly;
said steer wheel safety guard defining a length parallel to said axle, said length approximating said width of said rear steer wheel;
said steer wheel safety guard defining a height perpendicular to said length, said height extending below said plane of said axle.

5. The combination of claim 4, wherein said rear steer wheel is adapted to roll upon a surface below said axle, and wherein said height of said steer wheel safety guard extends downwardly proximate to said surface.

6. The combination of claim 4, wherein said bumper further includes flanges, said flanges extending forward adjacent said rear steer wheel.

7. The combination of claim 4, further including an axle strut, said axle strut extending from said bumper to said axle, said axle strut defining an aperture therethrough, said axle disposed through said aperture.

8. The combination of claim 7, wherein said axle strut is disposed upon said axle inboard of said rear steer wheel.

9. The combination of claim 7, wherein said axle strut is disposed upon said axle outboard of said rear steer wheel.

10. The combination of claim 7, wherein said axle further defines a mounting slot leading to said aperture, said mounting slot adapted for passage therethrough of said axle.

11. A combination, comprising:
a pallet truck, said pallet truck having a steering assembly, said steering assembly including:
steer wheels, said steer wheels residing on an axis of rotation, said steer wheels together defining a side-to-side width along said axis of rotation, said steer wheels further defining a radius of rotation;
a steering column, said steering column in communication with said steer wheels to turn said axis of rotation relative to said pallet truck;
a steer wheel safety guard, said steer wheel safety guard:
including a bumper, said bumper:
disposed behind said steer wheels,
defining a length parallel to said axis of rotation, said length at least as great as said side-to-side width of said steer wheels,
defining a height perpendicular to said length, said height extending at least half said radius of rotation below said axle;
including a steering column strut, said steering column strut defining opposed first and second ends, said first end attached to said bumper, said steering column strut extending from said bumper to said steering column, said second end attached to said steering column.

12. The combination of claim 11, wherein said steer wheels are adapted to roll upon a surface below said axle, and wherein said height of said steer wheel safety guard extends proximate to said surface.

13. The combination of claim 11, wherein said bumper further includes flanges, said flanges extending forward adjacent said steer wheels.

14. The combination of claim 11, further including an axle along said axis of rotation, and an axle strut, said axle strut extending from said bumper to said axle, said axle strut defining an aperture therethrough, said axle disposed through said aperture.

15. The combination of claim 14, wherein said axle strut is disposed upon said axle inboard of said steer wheels.

16. The combination of claim 15, wherein said axle further defines a mounting slot leading to said aperture, said mounting slot adapted for passage therethrough of said axle.

17. The combination of claim 14, wherein said axle strut is disposed upon said axle outboard of said steer wheels.

18. The combination of claim 14, wherein said axle further defines a mounting slot leading to said aperture, said mounting slot adapted for passage therethrough of said axle.

* * * * *